(12) United States Patent
Kuo (10) Patent No.: US 8,554,201 B2
(45) Date of Patent: *Oct. 8, 2013

(54) METHOD OF MANAGING QUEUING OPERATION FOR A WIRELESS COMMUNICATIONS SYSTEM AND RELATED APPARATUS

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 1469 days.

This patent is subject to a terminal disclaimer.

(21) Appl. No.: 12/121,811

(22) Filed: May 16, 2008

(65) Prior Publication Data

US 2008/0287120 A1    Nov. 20, 2008

Related U.S. Application Data

(60) Provisional application No. 60/938,708, filed on May 18, 2007.

(51) Int. Cl.
*H04W 24/00*    (2009.01)

(52) U.S. Cl.
USPC ............... 455/425; 455/422.1; 455/432.1; 455/450; 455/458; 370/395.1; 370/395.2; 370/395.21

(58) Field of Classification Search
USPC ............ 455/425, 422.1, 432.1, 450, 458; 370/395.1, 395.2, 395.21
See application file for complete search history.

(56) References Cited

U.S. PATENT DOCUMENTS

| 7,054,630 | B2* | 5/2006 | Nagpal et al. .......... 455/434 |
| 7,212,818 | B2* | 5/2007 | Haumont .......... 455/435.1 |
| 2003/0050097 | A1* | 3/2003 | Amirijoo et al. .......... 455/560 |
| 2003/0207702 | A1 | 11/2003 | Chen |
| 2004/0102219 | A1* | 5/2004 | Bunton et al. .......... 455/560 |
| 2004/0127243 | A1 | 7/2004 | Sarkkinen |
| 2004/0180675 | A1* | 9/2004 | Choi et al. .......... 455/458 |
| 2005/0070274 | A1 | 3/2005 | Pedlar |
| 2005/0101299 | A1* | 5/2005 | Farnsworth .......... 455/412.1 |
| 2005/0169210 | A1 | 8/2005 | Funnell |
| 2007/0135141 | A1* | 6/2007 | Farnsworth .......... 455/458 |
| 2008/0056198 | A1 | 3/2008 | Charpentier et al. |

FOREIGN PATENT DOCUMENTS

| JP | 2009510969 A | 3/2009 |
| KR | 1020040105257 A | 12/2004 |
| KR | 1020060026881 A | 3/2006 |
| KR | 100626968 B1 | 9/2006 |
| KR | 1020060121825 A | 11/2006 |
| KR | 1020080101807 A | 11/2008 |

(Continued)

OTHER PUBLICATIONS

3GPP TS 25.331 V6.13.0 (Mar. 2007).

(Continued)

*Primary Examiner* — Patrick Edouard
*Assistant Examiner* — Shantell L Heiber
(74) *Attorney, Agent, or Firm* — Blue Capital Law Firm, P.C.

(57) ABSTRACT

A method of managing a queuing operation of a user equipment, known as UE, in a paging state for a network terminal of a wireless communications system includes, through a cell update procedure, queuing the UE at a frequency carrier where the UE currently camps and keeping the UE in the paging state.

14 Claims, 5 Drawing Sheets

(56) References Cited

FOREIGN PATENT DOCUMENTS

| TW | 200402241 A | | 2/2004 |
|---|---|---|---|
| TW | 200415930 A | | 8/2004 |
| WO | 2006063310 A2 | | 6/2006 |
| WO | WO2007/040449 | * | 4/2007 |

OTHER PUBLICATIONS

3GPP TSG-RAN WG2 Meeting #58, Kobe, Japan, May 7-11, 2007 (R2-072278).
3GPP TSG-RAN WG2 Meeting #58bis, Orlando, USA, Jun. 25-29, 2007 (R2-072365).
3GPP TSG RAN WG2 #59, Athens, Greece, Aug. 20-24, 2007 (R2-073079).
Non-Final Office Action on related U.S. Appl. No. 12/121,810 issued on Dec. 21, 2010.
Office Action on corresponding CN patent application No. 200810100212.1 issued on Dec. 1, 2010.
Radio Resource Control (RRC) Protocol specification, 3GPP TS25.331 V7.4.0 (Mar. 2007), P159-P205.
Radio Resource Control (RRC) Protocol specification, 3GPP TS25.331 V7.4.0 (Mar. 2007), P325.
Office Action on corresponding JP patent application No. 2008-127552 issued on Jan. 18, 2011.
Office Action on corresponding JP patent application No. 2008-127554 issued on Jan. 18, 2011.
3GPP TS 25.331 V7.4.0 (Mar. 2007) Radio Resource Control (RRC); Protocol Specification (Release 7), p. 159-p. 193.
3GPP, R2-072278 3GPP TSG-RAN WG2 Meeting #58, "Introduction of Wait time to Cell Update Confirm", May 2007.
ETSI: "Universal Mobile Telecommunications System (UMTS); Radio Ressource Control (RRC) protocol specification (3GPP TS 25.331 version 3.10.0 Release 1999)", ETSI TS 125 331 V3.10.0, Mar. 2002, pp. 133-136, XP002256492.
3GPP: "3rd Generation Partnership Project; Technical Specification Group Radio Access Network; Radio Resource Control (RRC); protocol specification (Release 7)", Mar. 2007, 3GPP TS 25.331 V7.4.0, paragraphs [8.6.6][8.6.6.1][8.6.6.2], XP002554537.
Office Action on corresponding TW Patent Application No. 97118192 dated Oct. 28, 2011.

* cited by examiner

METHOD OF MANAGING QUEUING OPERATION FOR A WIRELESS COMMUNICATIONS SYSTEM AND RELATED APPARATUS

CROSS REFERENCE TO RELATED APPLICATIONS

This application claims the benefit of U.S. Provisional Application No. 60/938,708, filed on May 18, 2007 and entitled "Method And Apparatus for Improving UE Waiting during Cell Update Procedure in a Wireless Communication System", the contents of which are incorporated herein by reference.

BACKGROUND OF THE INVENTION

1. Field of the Invention

The present invention relates to a method of managing a queuing operation for a wireless communications system and related communications device, and more particularly to a method of managing a queuing operation corresponding to a cell update procedure in a wireless communications system and related communications device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

For the universal mobile telecommunications system (UMTS), the 3 G communications system comprises User Equipment (UE), the UMTS Terrestrial Radio Access Network (UTRAN), and the Core Network (CN). Communications protocols utilized include Access Stratum (AS) and Non-Access Stratum (NAS). AS comprises various sub-layers for different functions, including Radio Resource Control (RRC), Radio Link Control (RLC), Media Access Control (MAC), Packet Data Convergence Protocol (PDCP), and Broadcast/Multicast Control (BMC). The sub-layers mentioned, and their operating principles, are well known in the art, and detailed description thereof is omitted.

RRC is a Layer 3 communications protocol, and is the core of the AS communications protocol. All radio resource information exchange, radio resource configuration control, QoS control, channel transmission format configuration control, packet segmentation/concatenation processing and control, and NAS protocol transmission processing is performed by the RRC layer. Between the user end and the network end, the RRC layer exchanges RRC Messages, also known as signaling, through RRC procedures. RRC Messages are formed from many Information Elements (IE) used for embedding necessary information for setting, changing, or releasing protocol entities of Layer 2 (RLC, MAC) and Layer 1 (Physical Layer), thereby establishing, adjusting, or canceling information exchange channels to perform data packet transportation.

According to the RRC protocol specification developed by the 3rd Generation Partnership Project (3GPP), the RRC procedures include a cell update procedure, which is initiated by the UE in response to certain events in UE e.g. uplink data transmission, paging response, or cell reselection. The RRC message exchange in the cell update procedure includes a CELL UPDATE message transmitted from the UE to the UTRAN, and a CELL UPDATE CONFIRM message transmitted from the UTRAN to the UE. According to content of the CELL UPDATE CONFIRM message, the UE performs radio bearer reconfiguration or release, mobile information update, or transport channel reconfiguration, etc.

During the cell update procedure, the UTRAN can utilize a queuing operation to queue the UE when the current serving frequency carrier is congested. Under the queuing operation, the UE is directed to another frequency carrier for a certain time and re-initiates the cell update procedure. The related detailed operation is described as follows. After the UE transmits the CELL UPDATE message after the initiation of the cell update procedure, the UTRAN includes a "Frequency info" IE and a "wait time" IE in the CELL UPDATE CONFIRM message in response to the CELL UPDATE message for indicating the UE to perform the queuing operation. After receiving the CELL UPDATE CONFIRM message, the UE in CELL_PCH state selects a dedicated cell on the new frequency carrier, whereas the UE in the URA_PCH state selects a cell belonging to the dedicated URA. After the cell selection, the UE waits at least the time given by the "wait time" IE, and then reinitiates the cell update procedure. The frequency carrier indicated in the wait time IE is never the current frequency carrier the UE uses.

The nearby frequency carriers could be more congested when the serving frequency carrier of the UTRAN is congested, or no other frequency carrier is available. In these situations, it is not proper or impossible for the UTRAN to queue the UE on other frequency carriers.

SUMMARY OF THE INVENTION

The present invention therefore provides a method of managing a queuing operation for both a network terminal and a UE of a wireless communications system and related communications device that can avoid failure in the queuing operation.

The present invention discloses a method of managing a queuing operation corresponding to a UE in a paging state for a network terminal of a wireless communications system. The method includes, through a cell update procedure, queuing the UE at a frequency carrier where the UE currently camps and keeping the UE in the paging state.

The present invention further discloses a communications device of a wireless communications system for managing a queuing operation corresponding to a UE in a paging state to avoid failure in queuing the UE. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes, through a cell update procedure, queuing the user equipment at a frequency carrier where the UE currently camps and keeping the UE in the paging state.

The present invention further discloses a method of managing a queuing operation for a UE in a paging state in a wireless communications system. The method includes initiating a cell update procedure, and then queuing at a currently-camped frequency carrier and staying in the paging state if a received response message of the cell update procedure includes a first information element used for providing a waiting time of the queuing operation and does not include a second information element used for providing information of a frequency carrier for queuing.

The present invention further discloses a communications device in a paging state of a wireless communications system for managing a queuing operation to avoid failure in performance of the queuing operation. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes initiating a cell update procedure, and then queuing at a currently-camped frequency carrier and staying in the paging state if a received response message of the cell update procedure includes a first information element used for providing a waiting time of the queuing operation and does not include a second information element used for providing information of a frequency carrier for queuing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
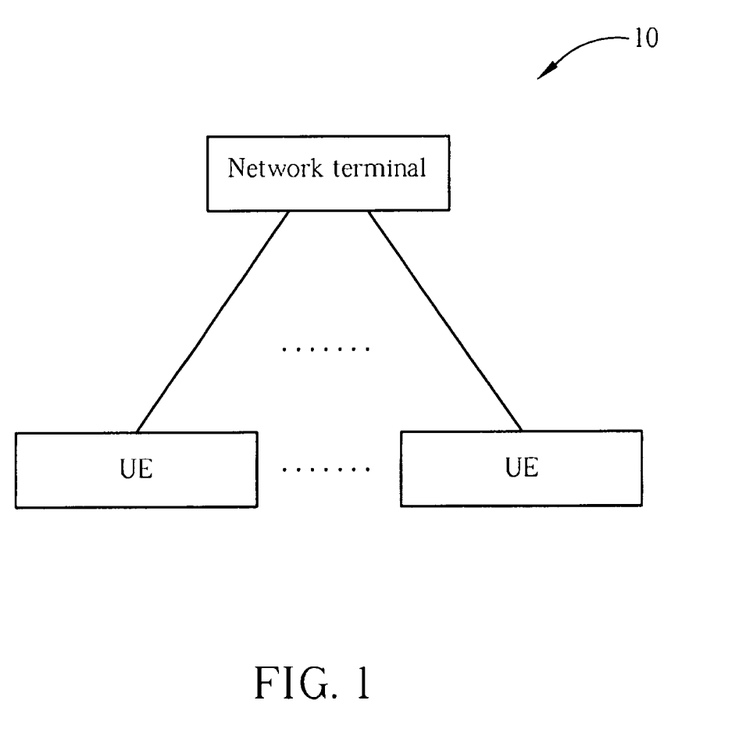
FIG. 1 is a schematic diagram of a wireless communications system.

Please refer to FIG. 1, which is a schematic diagram of a wireless communications system 10. The wireless communications system 10 is preferred to be a third generation (3G) mobile communications system, and is briefly formed with a network terminal and a plurality of user equipments. In FIG. 1, the network terminal and the user equipments are simply utilized for illustrating the structure of the wireless communications system 10. Practically, the network terminal may include a plurality of base stations, radio network controllers and so on according to actual demands, and the user equipments (UEs) can be apparatuses such as mobile phones, computer systems, etc.

Figure 2:
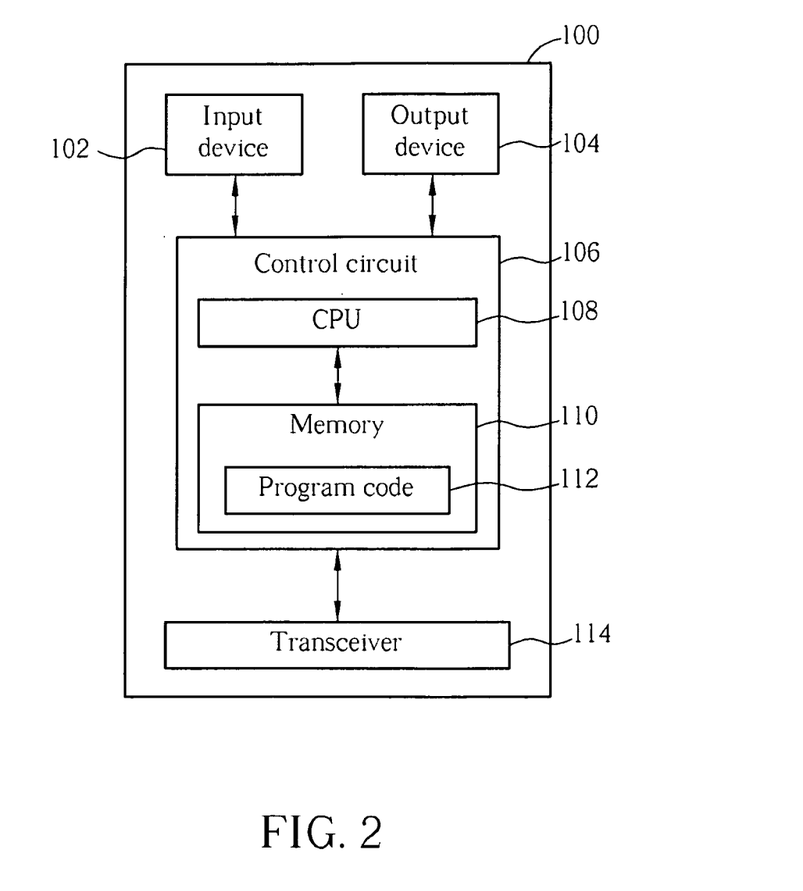
FIG. 2 is a functional block diagram of a communications device.

Please refer to FIG. 2, which is a functional block diagram of a communications device 100. The communications device 100 can be utilized for realizing the network terminal or the UEs in FIG. 1. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
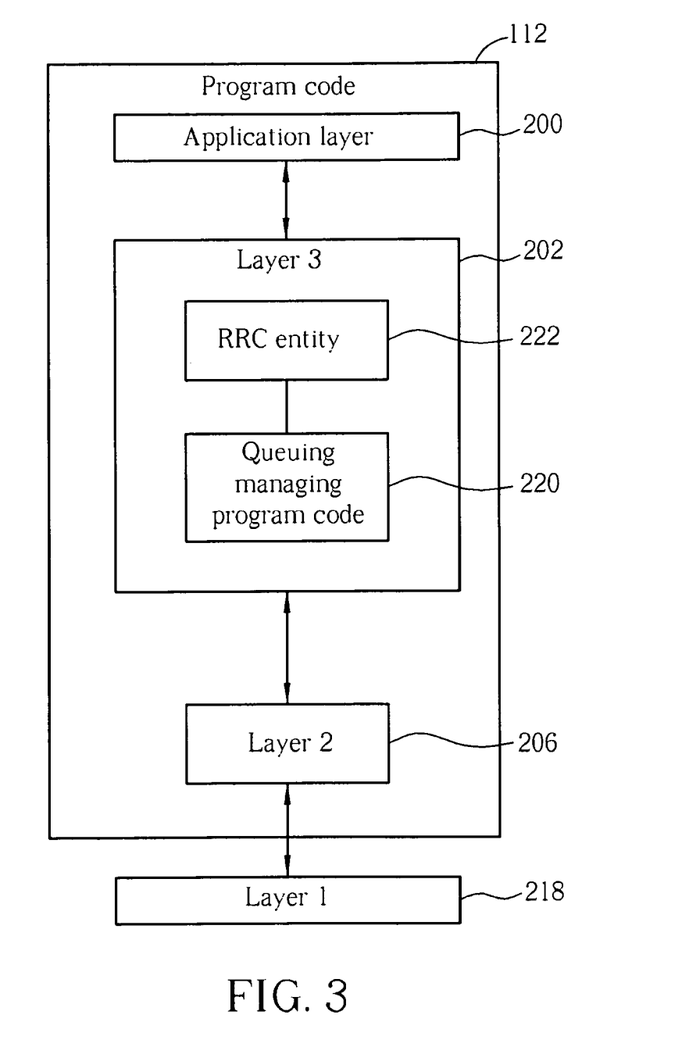
FIG. 3 is a diagram of the program code shown in FIG. 2.

Please continue to refer to FIG. 3. FIG. 3 is a diagram of the program code 112 shown in FIG. 2. The program code 112 includes an application layer 200, a Layer 3 202, and a Layer 2 206, and is coupled to a Layer 1 218. The Layer 3 202 includes a radio resource control (RRC) entity 222 for controlling the Layer 1 218 and the Layer 2 206 with RRC messages and information elements (IEs) and thereby exchanging signaling with other communications device through RRC procedures.

Figure 4:
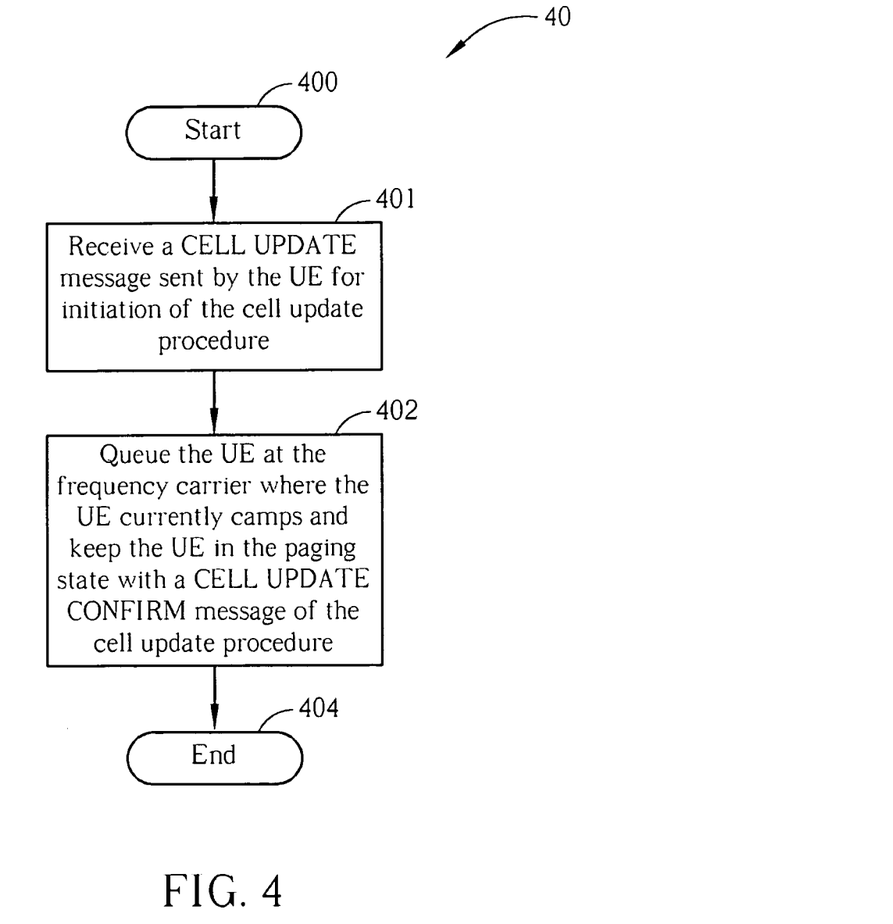
FIG. 4 is a flowchart diagram of a process for a network terminal according to an embodiment of the present invention.

When the communications device 100 is utilized for realizing the network terminal of the wireless communications system 10, the communications device 100 can queue the UE in a paging state, which is preferably a CELL_PCH or a URA_PCH state. The UE in the CELL_PCH or the URA_PCH state generally can initiate a cell update procedure in response to certain events in UE e.g. uplink data transmission, paging response, or cell reselection. In this situation, the embodiment of the present invention provides a queuing managing program code 220 for the queuing operation to avoid failure in queuing the UE. Please refer to FIG. 4, which illustrates a schematic diagram of a process 40 according to an embodiment of the present invention. The process 40 is utilized for managing a queuing operation corresponding to a UE in a paging state for a network terminal of the wireless communications system 10, and can be compiled into the queuing managing program code 220. The process 40 includes the following steps:

Step 400: Start.

Step 401: Receive a CELL UPDATE message sent by the UE for initiation of the cell update procedure.

Step 402: Queue the UE at the frequency carrier where the UE currently camps and keep the UE in the paging state with a CELL UPDATE CONFIRM message of the cell update procedure.

Step 404: End.

According to the process 40, the embodiment of the present invention queues the UE at its current frequency carrier, and further keeps the UE in the original paging state through message exchange of the cell update procedure. In other words, the UE does not change its frequency carrier and RRC state when the queuing operation is performed.

The message exchange of the cell update procedure includes a CELL UPDATE message transmitted from the UE to the network terminal and a CELL UPDATE CONFIRM message sent by the network terminal in response to the CELL UPDATE message. The CELL UPDATE message is sent for notifying the network terminal of the current communications state of the UE and also for initiating the cell update procedure.

To queue the UE at the current frequency carrier, the network terminal preferably includes a wait time IE in the CELL UPDATE CONFIRM message, and excludes a Frequency info IE from the CELL UPDATE CONFIRM message, then sends the CELL UPDATE CONFIRM message to the UE. The UE correspondingly stays in a waiting state of the queuing operation for at least a wait time provided by the wait time IE. The Frequency info IE is used for indicating the UE of the frequency carrier for queuing, which is not the current frequency carrier of the UE. Furthermore, the UE re-initiates the cell update procedure when the UE leaves the waiting state.

When the communications device 100 is utilized for realizing the UE of the wireless communications system 10, the RRC entity 222 can change an RRC state of the communications device 100, switching among an Idle mode, a CELL_PCH, a URA_PCH, a CELL_FACH or a CELL_DCH state. The CELL_PCH and URA_PCH state are paging states, and the communications device 10 in the CELL_PCH or the URA_PCH state generally can initiate a cell update procedure in response to certain events in UE.

Figure 5:
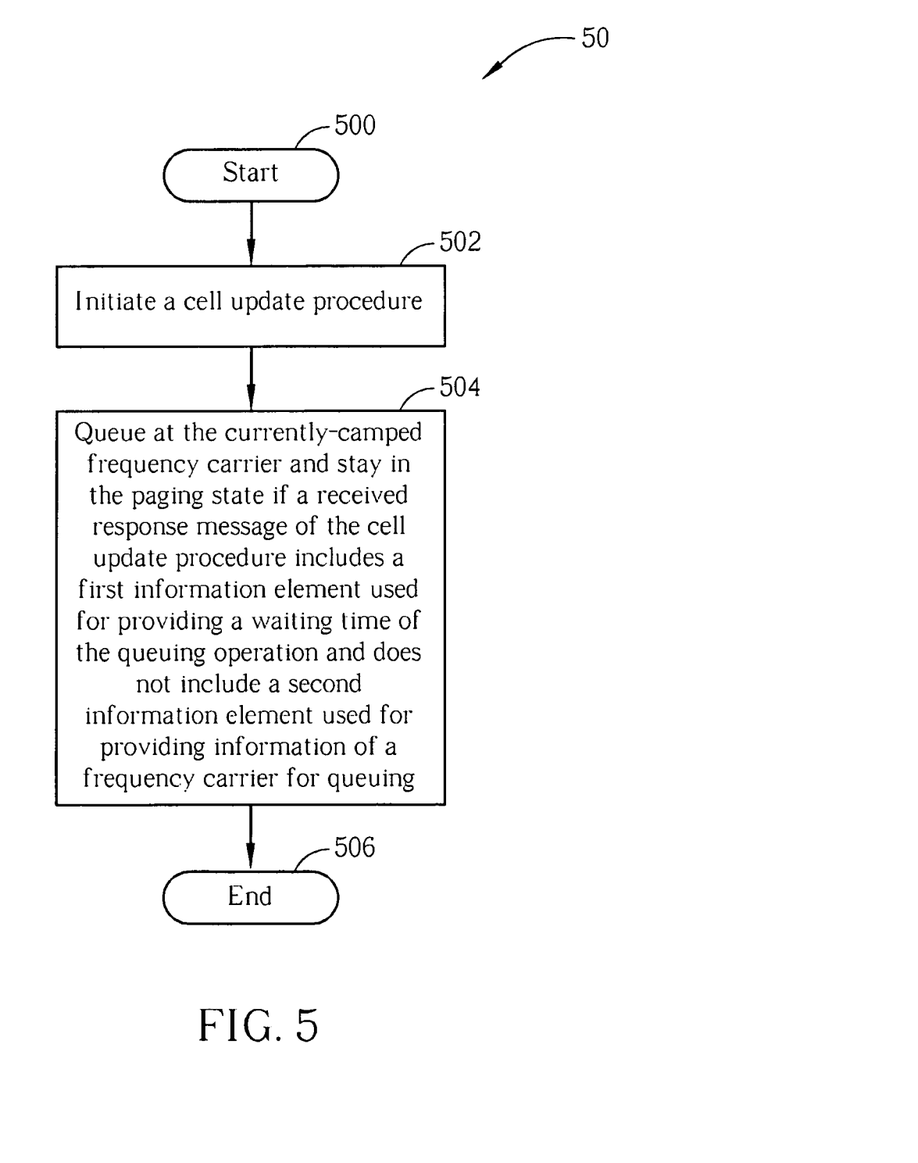
FIG. 5 is a flowchart diagram of a process for a user equipment according to an embodiment of the present invention.

For the communications device 100 utilized for realizing the UE, the embodiment of the present invention also provides a method of handling the queuing operation. Please refer to FIG. 5, which illustrates a schematic diagram of a process 50 according to an embodiment of the present invention. The process 50 is utilized for managing a queuing operation for a UE in a paging state in the wireless communications system 10, and can be compiled into the queuing managing program code 220. The process 50 includes the following steps:

Step 500: Start.
Step 502: Initiate a cell update procedure.
Step 504: Queue at the currently-camped frequency carrier and stay in the paging state if a received response message of the cell update procedure includes a first information element used for providing a waiting time of the queuing operation and does not include a second information element used for providing information of a frequency carrier for queuing.
Step 506: End.

According to the process 50, the UE in the paging state receives a response message from the network terminal after initiating the cell update procedure. The UE queues at the frequency carrier where the UE currently camps and stays in the paging state if the response message includes the first information element used for providing a waiting time of the queuing operation and does not include the second information element used for providing information of a frequency carrier for queuing. Preferably, the first IE provides a waiting time for the UE, and thereby the UE enters and stays in a waiting state for at least the waiting time and then re-initiates the cell update procedure when leaving the waiting state. Preferably, the response message is a CELL UPDATE CONFIRM message. In this situation, the first IE is a wait time IE and the second IE is a Frequency info IE.

Therefore, with cooperation of the processes 40 and 50, the UE can queue at the current frequency carrier and in the current paging state when the queuing operation is performed.

Please note that the embodiments of the present invention and the related prior art can co-manage the queuing operation. For example, when the UE initiates the cell update procedure, the network terminal (ex. the UTRAN) can determine which frequency carrier for queuing the UE should switch to. If all neighboring frequency carriers are congested or nonexistent, the network terminal queues the UE at the original frequency carrier and keeps the UE in the same paging state.

According to the prior art, the network terminal forbids the UE from queuing at the currently camped frequency carrier, and thereby the UE may fail in the queuing operation due to nonexistent or congested neighboring frequency carriers. Comparatively, the embodiments of the present invention allow the UE to queue at the currently camped frequency carrier to avoid the problems of the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing a queuing operation corresponding to a user equipment in a paging state in a RRC Connected mode for a network terminal of a wireless communications system, the method comprising:
   receiving a CELL UPDATE message of a cell update procedure from the user equipment; and
   in response to reception of the CELL UPDATE message, queuing the user equipment at a frequency carrier where the user equipment currently camps and keeping the user equipment in the paging state in the RRC Connected mode by:
      including a wait time information element in a CELL UPDATE CONFIRM message;
      excluding a Frequency info information element from the CELL UPDATE CONFIRM message; and
      sending the CELL UPDATE CONFIRM message to the user equipment to specify that the user equipment stays in a waiting state of the queuing operation for at least a waiting time according to the waiting time provided by the wait time information, element, and re-initiates the cell update procedure when the user equipment leaves the waiting state.

2. The method of claim 1, wherein the paging state is a CELL_PCH state or a URA_PCH state.

3. A communications device of a wireless communications system for managing a queuing operation corresponding to a user equipment in a paging state to avoid failure in queuing the user equipment, the communications device comprising:
   a control circuit for realizing functions of the communications device;
   a central processing unit coupled to the control circuit for executing a program code to operate the control circuit; and
   a memory coupled to the central processing unit for storing the program code;
   wherein the program code comprises:
      receiving a CELL UPDATE message of a cell update procedure from the user equipment; and
      in response to reception of the CELL UPDATE message, queuing the user equipment at a frequency carrier where the user equipment currently camps and keeping the user equipment in the paging state in a RRC Connected mode by:
         including a wait time information element in a CELL UPDATE CONFIRM message;
         excluding a frequency info information element from the CELL UPDATE CONFIRM message; and
         sending the CELL UPDATE CONFIRM message to the user equipment to specify that the user equipment stays in a waiting state of the queuing operation for at least a waiting time according to the waiting time provided by the wait time information element, and re-initiates the cell update procedure when the user equipment leaves the waiting state.

4. The communications device of claim 3, wherein the paging state is a CELL_PCH state or a URA_PCH state.

5. A method of managing a queuing operation for a user equipment in a paging state in a RRC Connected mode in a wireless communications system, the method comprising:
   initiating a cell update procedure;
   sending a CELL UPDATE message to a network terminal;
   receiving a CELL UPDATE CONFIRM message from the network terminal;

in response to reception of the CELL UPDATE CONFIRM message, queuing at a currently-camped frequency carrier and staying in the paging state in the RRC Connected mode if the CELL UPDATE CONFIRM message includes a first information element used for providing a waiting time of the queuing operation and does not include a second information element used for providing information of a frequency carrier for queuing; and entering a waiting state of the queuing operation for at least the waiting time according to the waiting time provided by the first information element and re-initiating the cell update procedure when leaving the waiting state.

6. The method of claim 5, wherein the received response message is a CELL UPDATE CONFIRM message.

7. The method of claim 6, wherein the first information element is a wait time information element.

8. The method of claim 6, wherein the second information element is a Frequency info information element.

9. The method of claim 5, wherein the paging state is a CELL_PCH state or a URA_PCH state.

10. A communications device in a paging state of a wireless communications system for managing a queuing operation to avoid failure in performance of the queuing operation, the communications device comprising:

a control circuit for realizing functions of the communications device;

a central processing unit coupled to the control circuit for executing a program code to operate the control circuit; and a memory coupled to the central processing unit for storing the program code;

wherein the program code comprises:

initiating a cell update procedure;

sending a CELL UPDATE message to a network terminal;

receiving a CELL UPDATE CONFIRM message from the network terminal;

in response to reception of the CELL UPDATE CONFIRM message, queuing at a currently-camped frequency carrier and staying in the paging state in the RRC Connected mode if the CELL UPDATE CONFIRM message includes a first information element used for providing a waiting time of the queuing operation and does not include a second information element used for providing information of a frequency carrier for queuing; and entering a waiting state of the queuing operation for at least the waiting time according to the waiting time provided by the first information element and re-initiating the cell update procedure when leaving the waiting state.

11. The communications device of claim 10, wherein the received response message is a CELL UPDATE CONFIRM message.

12. The communications device of claim 11, wherein the first information element is a wait time information element.

13. The communications device of claim 11, wherein the second information element is a Frequency info information element.

14. The communications device of claim 10, wherein the paging state is a CELL_PCH state or a URA_PCH state.

* * * * *